United States Patent
Finkbeiner et al.

(10) Patent No.: US 7,700,070 B2
(45) Date of Patent: Apr. 20, 2010

(54) PROCESS AND APPARATUS FOR CATALYTIC CONVERSION OF HYDROCARBONS FOR GENERATING A GAS RICH IN HYDROGEN

(75) Inventors: Hartmut Finkbeiner, Baiersbronn (DE); Jürgen Gieshoff, Biebergemünd (DE)

(73) Assignee: Umicore AG & Co. KG, Hanau-Wolfgang (DE)

( * ) Notice: Subject to any disclaimer, the term of this patent is extended or adjusted under 35 U.S.C. 154(b) by 967 days.

(21) Appl. No.: 10/559,251

(22) PCT Filed: Jun. 3, 2004

(86) PCT No.: PCT/EP2004/006006
§ 371 (c)(1), (2), (4) Date: Apr. 27, 2006

(87) PCT Pub. No.: WO2004/110596
PCT Pub. Date: Dec. 23, 2004

(65) Prior Publication Data
US 2006/0254140 A1    Nov. 16, 2006

(30) Foreign Application Priority Data
Jun. 6, 2003    (EP) .................................. 03012918

(51) Int. Cl.
*C01B 3/24* (2006.01)
*B01J 7/00* (2006.01)

(52) U.S. Cl. .......................... 423/650; 48/61; 48/214 A
(58) Field of Classification Search .................. 423/650
See application file for complete search history.

(56) References Cited

U.S. PATENT DOCUMENTS

2002/0012618 A1   1/2002   Bromberg et al.
2003/0167758 A1*   9/2003   Brown et al. ................... 60/299

FOREIGN PATENT DOCUMENTS

| DE | 108 18 792 C1 | 9/2001 |
| EP | 1 094 206 A2 | 4/2001 |
| EP | 1 211 394 A2 | 6/2002 |
| WO | WO 00/76637 A | 12/2000 |

OTHER PUBLICATIONS

International Search Report.
Written Opinion.

* cited by examiner

*Primary Examiner*—Melvin C Mayes
*Assistant Examiner*—Kenneth Vaden
(74) *Attorney, Agent, or Firm*—Kalow & Springut LLP; William D. Schmidt

(57) ABSTRACT

The present invention relates to the catalytic conversion of hydrocarbons for generating a gas that is rich in hydrogen, to the use of said apparatus and to a process for generating hydrogen. The apparatus comprises a reforming catalyst (5), as well as a means (8) for supplying hydrocarbons to the catalyst. The reforming catalyst is arranged in an exhaust pipe (3) through which the exhaust gases of combustion processes are passed.

14 Claims, 1 Drawing Sheet

PROCESS AND APPARATUS FOR CATALYTIC CONVERSION OF HYDROCARBONS FOR GENERATING A GAS RICH IN HYDROGEN

FIELD OF THE INVENTION

The present invention relates to the catalytic conversion of hydrocarbons.

BACKGROUND

Hydrogen is an important element for many chemical processes and is used in many technical methods. Hydrogen is required, for instance, as fuel for the generation of electric energy in fuel cells on board motor vehicles. However, because of the hazards of storing hydrogen, hydrogen is typically not stored on motor vehicles. Instead, apparatuses and processes have been developed to generate hydrogen on board motor vehicles from gasoline or diesel fuel in order to form a gas stream that contains hydrogen.

In one method, for instance, steam is added to the fuel and this mixture is converted in what is referred to as a steam reforming process into hydrogen and carbon monoxide. The hydrogen is used as fuel for a PEM fuel cell. This steam reforming process is endothermic and requires an additional burner for heating the reforming reactor to the required reaction temperature of from about 700 to 800° C.

Alternatively, the reforming process can be conducted auto thermally by adding a certain amount of oxygen to the mixture of steam and fuel such that first heat is generated by catalytic partial oxidation (CPO) of the fuel and then causing steam reforming to commence. According to this process, the reformate comprises about 30 to 40% by volume of hydrogen and additionally 10 to 15% by volume of carbon monoxide, which must be reduced to below 50 ppm by volume by means of subsequent purification steps (high and low temperature shift steps; HTS and LTS; preferential oxidation PROX) in order to avoid contamination of the PEM fuel cell.

A process for auto thermal steam reforming of hydrocarbons is described in US 2002/0009408 A1. This process requires heating of the reaction mixture to a pre-heating temperature and then feeding the reaction mixture to a catalytic reactor for performing the auto thermal steam reforming. In total, conventional auto thermal steam reforming is performed in a bulky and elaborate apparatus.

Since hydrogen or a gas enriched in hydrogen may be used in a vehicle for various purposes, there is a need to develop a more compact apparatus and efficient process for the generation of hydrogen on board a vehicle. The present invention provides one solution to this problem

SUMMARY OF THE INVENTION

The present invention is directed to the catalytic conversion of hydrocarbons, and provides an apparatus for generating hydrocarbons, a method of use of the apparatus, and a process for generating a gas stream enriched in hydrogen. The resulting gas stream may then be exposed to apparatuses such as fuel cells, particulate filters, and NOx storage catalysts.

The apparatus comprises a catalyst, as well as a device for supplying hydrocarbons to the catalyst. In the apparatus, the catalyst is arranged in an exhaust pipe through which the exhaust gases of combustion processes are passed. Additional hydrocarbons are added to the exhaust stream, and when sufficient reforming conditions are established, may be used as a source of hydrogen without the introduction of an external ignition mechanism. Thus, it permits the efficient generation of hydrogen from the exhaust gases of internal combustion engines, especially from the exhaust gases of lean burning engines.

According to one embodiment, the present invention provides an apparatus for the catalytic conversion of hydrocarbons that comprises:
 a) a first exhaust gas pipe, wherein said first exhaust gas pipe is capable of carrying a first partial exhaust gas stream;
 b) a fuel injector and a reforming catalyst located in sequence within said first exhaust gas pipe; and
 c) a second exhaust gas pipe, wherein said second exhaust gas pipe is capable carrying a second partial exhaust gas stream.

Preferably, the apparatus of the present invention is operated under lean conditions in an exhaust system of an internal combustion engine, especially a diesel engine.

According to a second embodiment, the present invention provides a process for generating an exhaust gas enriched in hydrogen and carbon monoxide; said process comprises the steps of:
 a) introducing fuel into a lean exhaust gas stream to reduce its normalized air/fuel ratio to a value of below 1 and conducting this exhaust gas stream over a reforming catalyst;
 b) burning a first portion of the injected fuel on the catalyst to heat the catalyst to a reforming temperature; and
 c) converting a second portion of said injected fuel into a gas comprising carbon monoxide and hydrogen.

This process offers a means for generating a gas enriched in hydrogen and carbon monoxide. The exhaust stream that is used already contains water and possesses a temperature suitable for burning hydrocarbons on the catalyst. This exhaust gas stream in combination with the first portion of the injected fuel is used to generate heat, carbon monoxide and hydrogen by catalytic partial oxidation, that is by burning a first portion of the injected hydrocarbons at the catalyst with the oxygen contained in the exhaust gas. With decreasing oxygen content and increasing temperature of the exhaust gas stream the operating conditions become more favorable for steam reforming of a second portion of the injected fuel.

The process offers the advantage of reduced soot formation during partial oxidation due to the water content of the exhaust gas. Still further, due to the high temperatures, the system automatically burns off adhering soot with the oxygen contained in the exhaust gas.

The present invention is particularly beneficial for generating hydrogen and carbon monoxide for mobile and relatively small stationary applications. The exhaust gas, which is enriched in hydrogen and carbon monoxide can be used in various ways. For example, it is conventional to inject hydrocarbons into the exhaust gas of lean burn engines to regenerate nitrogen oxides storage catalysts with respect to stored nitrogen oxides or with respect to poisoning with sulfur compounds. It is also known to inject additional hydrocarbons in front of an oxidation catalyst followed by a particulate filter to regenerate the particulate filter with the heat generated by burning the hydrocarbons on the oxidation catalyst. In all such applications it is advantageous to replace the hydrocarbons with hydrogen and carbon monoxide generated with the above process because hydrogen and carbon monoxide are much more reactive species than hydrocarbons.

Thus, according to the present invention it is contemplated for all applications, wherever additional hydrocarbons have to be injected into the exhaust gas stream to perform a certain task, not to use the hydrocarbons directly but to reform them and use the generated hydrogen and carbon monoxide instead to fulfill the task.

DETAILED DESCRIPTION

Figure 1:
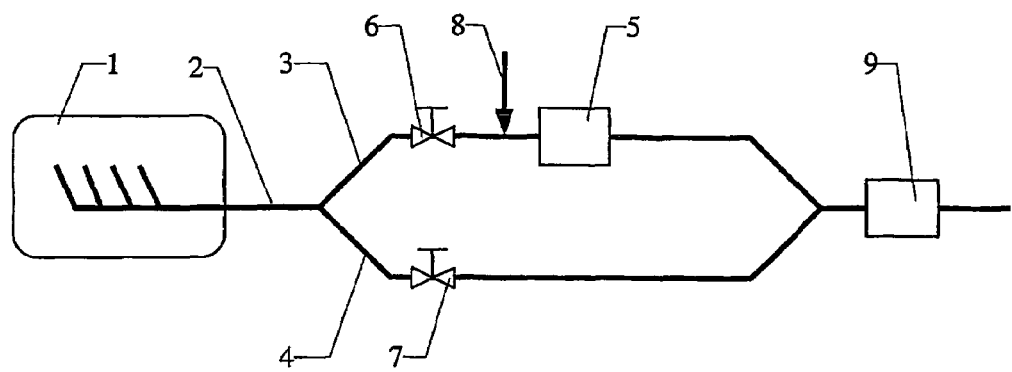
FIG. 1: Schematic representation of a certain embodiment of the apparatus according to the invention

The present invention is directed toward the catalytic conversion of hydrocarbons for generating a gas rich in hydrogen. An apparatus, a method for using the apparatus and a process are provided.

This disclosure is not intended to be a primer on catalyst or hydrogen generation technologies. Basic concepts are known to persons skilled in the art and are not set forth in detail herein.

According to one embodiment, the present invention provides an apparatus for the catalytic conversion of hydrocarbons in order to generate a gas that is rich in hydrogen. The apparatus comprises a catalyst and a device for supplying hydrocarbons to the catalyst. The device for supplying the hydrocarbons is referred to herein as a "fuel injector."

The apparatus of the present invention may, for example, be located within the exhaust stream of a diesel engine or other lean burn engines. As persons skilled in the art are aware, diesel engines are typically operated under lean conditions. Thus, in a diesel engine, the exhaust gas prior to the addition of hydrocarbons by the fuel injector will have a normalized lambda value or normalized air/fuel ratio greater than or equal to approximately one.

The catalyst is arranged in an exhaust pipe, referred to herein as "a first exhaust gas pipe," and carries a first exhaust gas stream, that is a first portion of the exhaust gases of combustion processes. Preferably, under lean operating conditions, the catalyst is capable of converting hydrocarbons into water and carbon dioxide and under reforming conditions, able to convert the supplied hydrocarbons at least partially into carbon monoxide and hydrogen. More preferably, the catalyst is a reforming or a three-way catalyst.

The apparatus of the present invention further comprises a second exhaust gas pipe. The first exhaust gas pipe and second exhaust gas pipe may be physically separate, forming parallel exhaust streams or the first exhaust gas pipe may be located within the second exhaust gas pipe, in which case the outer surface of the first exhaust gas pipe forms the inner surface of the second exhaust gas pipe.

In the apparatus, one portion of the exhaust gas from the engine travels into the first exhaust gas pipe, and another portion of the exhaust gas from the engine travels into the second exhaust gas pipe. A fuel injection mechanism or fuel injector adds hydrocarbons to a first exhaust gas stream that travels through the first exhaust gas pipe. Preferably, one adds the hydrocarbons to the first exhaust gas pipe upstream of the catalyst. The amount of fuel and exhaust gas flow needed is a function of the flow through the catalyst, the temperature of the catalyst and the $H_2$— and $CO$— concentration that is needed in the utilization step, which, for example, is the step in which the hydrogen and carbon monoxide are used to regenerate a downstream catalyst.

Preferably, the apparatus further comprises a temperature probe for measuring the temperature of the catalyst. The use of the temperature probe permits the automatic monitoring of when the injected fuel should be added. Thus, the injection may be self-starting.

The first exhaust gas pipe and the second exhaust gas pipe are part of the total exhaust gas system and are located downstream of the engine. The first exhaust gas pipe and the second exhaust gas pipe are structured such that a portion of the exhaust gas from the engine enters one or the other exhaust gas pipes thereby forming a first partial exhaust gas stream and a second partial exhaust gas stream, respectively.

Preferably, the apparatus comprises a means for controlling partial flow of exhaust gas between said first and second exhaust gas pipes. Such means may be a throttle to control the amount of exhaust gas entering the first exhaust gas pipe, and more preferably a separate throttle is used to enable the control of the amount of exhaust gas to enter the second exhaust gas pipe, as well.

In a basic embodiment, the first exhaust gas pipe and the second exhaust gas pipe are located downstream of a motor, and the aforementioned throttles or other mechanisms for controlling the flow of a volume of gas are present at the beginning of each of the exhaust gas pipes. Additionally, preferably, within the first exhaust gas pipe is a means to supply atomization air in connection with a means by which to supply the hydrocarbons downstream of the throttle for the first exhaust gas pipe. These hydrocarbons are referred to herein as "injected fuel."

Downstream of the entry point of the injected fuel, is a reforming zone, in which the aforementioned reforming catalyst ("the first catalyst" or "catalytic converter") is located, and where under appropriate conditions, the hydrogen is generated. Further downstream of the reforming zone, the first exhaust gas stream is joined with the second exhaust gas stream to form a joined exhaust gas stream. This joined exhaust gas stream may then, for example, be exposed to a particle filter or a nitrogen storage catalyst.

It is particularly advantageous for the first exhaust gas pipe to be located within the second exhaust gas pipe. Under this sub-embodiment, the first exhaust pipe may be designed to form a short pipe piece that has an outer surface area and an inner surface. The short pipe may be positioned within a second exhaust pipe such that the second partial flow of the exhaust gas is passed along the outer surface area of the first exhaust pipe. In this embodiment, the heat of the exhaust gas within the second exhaust gas pipe may be used to heat the outer surface area of the first exhaust gas pipe, which will heat the inner surface area and the first exhaust gas itself, and facilitate the establishment of reforming conditions.

The apparatus of the present invention may be used in many different applications, including applications in which other catalysts, referred to herein as "second catalysts" are located downstream of the first catalyst. For example, the exhaust gas of the first catalyst may be supplied as fuel to the anode of a fuel cell. The anode exhaust gas may then be joined with second exhaust gas stream.

In another embodiment, the apparatus may comprise a NOx storage catalyst located downstream of the first catalyst and the exhaust gas that contains increased levels of hydrogen may be utilized for engine independent regeneration of the NOx storage catalyst.

In still another embodiment, the apparatus may comprise a particulate filter located downstream of the first catalyst. The exhaust gas, which contains increased amounts of hydrogen, may be utilized for the engine-independent regeneration of the particulate filter.

The apparatus is particularly beneficial for the generation of hydrogen for mobile and relatively small stationary applications, and may, for example, be used as an electric power supply unit for a motor vehicle.

Under a preferred process for operating the apparatus of the present method, hydrogen may be generated by introducing injected fuel into a lean first exhaust gas stream upstream of a first catalyst such to reduce the air/fuel ratio to a value of below 1. Both residual unburned and partially burned hydrocarbons that enter the exhaust stream from the engine, as well as hydrocarbons from the injected fuel may be burned at the catalyst to heat the catalyst to a reforming temperature. After reforming conditions have been established, another portion of the hydrocarbons from the injected fuel, may be converted into a gas comprising carbon monoxide and hydrogen.

For example, one may use a partial stream of exhaust gases from a diesel engine or a stationery burner, (a first exhaust gas stream) when the exhaust exceeds a minimum temperature of, for example, 200° C. A hydrocarbon-containing fuel, for example, diesel, gasoline, or liquid gas, may be added to the first exhaust gas stream. Within this partial stream, addition of air is limited so that the maximum value of the normalized air/fuel ratio $\lambda$ is less than 1 and preferably less than 0.8, and preferably is between 0.5 and 0.6 after the hydrocarbon-containing fuel has been injected. If liquid fuel is used, then preferably the fuel is metered by a single or two component nozzle, an ultrasonic atomizer or other comparable means for fuel atomization.

While the exhaust gas is lean, the unburned or partially burned hydrocarbons from the engine are converted into water and carbon dioxide while generating heat. This process will commence between approximately 200° C. and 250° C. Additional fuel may be injected into this stream, which until sufficient reformation conditions are established will also be converted to $H_2O$ and $CO_2$, generating heat. The portion of the injected fuel that is converted into $H_2O$ and $CO_2$ may be referred to as a "first portion of injected fuel." However, when sufficiently rich conditions are generated, the presence of the heat and water establishes steam reformation conditions and the formation of carbon monoxide and hydrogen.

The portion of the injected fuel that is converted into CO and $H_2$ may be referred to as a "second portion of injected fuel." The phrases first portion of injected fuel and second portion of injected fuel are used for the convenience of identifying the two different products. The portion of fuel themselves may be supplied from the same fuel injector in a continuous stream, and whether a portion of the injected fuel is denoted as part of the first portion or the second portion is dictated by whether the requisite conditions to convert the hydrocarbons into hydrogen have been achieved.

Thus, under normal operating conditions, lean exhaust gas enters both the first exhaust gas pipe and the second exhaust gas pipe. The injection of the fuel at an appropriate temperature may be monitored and triggered by the aforementioned temperature probe.

The formation of hydrogen, which takes place under rich conditions in the catalyst, is a combination of the steam reforming process and the partial oxidation of the hydrocarbon in the fuel. Under typical steam reforming processes, an additional water supply is needed. However, according to the present invention, water (in the form of steam) is already present in the exhaust gas stream. The water (steam) in the exhaust gas prevents soot formation.

The reforming temperature will be reached by the exhaust gas that preferably has been combined with the first portion of the injected fuel and burned at an appropriate installation point within the exhaust gas line. This self-starting mechanism avoids the need for additional hardware like spark plugs, high-voltage equipment and safety installations.

The gases that are produced may be used directly for regeneration of particulate filters or NOx storage catalysts. Further, these gases may be used to operate fuel cells.

The invention will now be further explained with the help of the accompanying figures.

FIG. 1 gives a schematic representation of a specific embodiment of the apparatus according to the invention. The lean exhaust gases of the diesel engine (1) exit the engine via exhaust pipe (2). Exhaust pipe (2) splits into a first exhaust pipe (3) and a second exhaust pipe (4). First exhaust pipe (3) carries a first partial exhaust gas stream over reforming-catalyst (5) and is rejoined with a second partial exhaust gas stream carried by the second exhaust gas pipe. The rejoined exhaust gas stream is then cleaned in an exhaust gas cleaning unit (9) before the exhaust gas is emitted into the atmosphere. The exhaust gas cleaning unit (9) may be a single catalyst or a suitable arrangement of several catalysts and/or a particulate filter. The ultimate choice of catalyst(s) depends on the degree of exhaust gas cleaning which has to be achieved.

This apparatus is used to produce an exhaust gas enriched in carbon monoxide and hydrogen on demand e.g. to treat the catalysts contained in the cleaning unit. Such treatment may be initiated to regenerate a particulate filter or a nitrogen oxide storage catalyst contained in the exhaust gas cleaning unit.

Arrow (8) in FIG. 1 symbolizes a means for introducing hydrocarbons, e.g. diesel fuel, into the first exhaust gas stream in front of reforming catalyst (5). These hydrocarbons are then converted into carbon monoxide and hydrogen by auto thermal steam reforming at the reforming catalyst. Any suitable reforming catalyst known in the art for this task can be used—e.g. the catalysts described in US 2002/0009408 A1 comprising at least one platinum group metal on an oxidic support material selected from the group consisting of aluminum oxide, silicon dioxide, titanium dioxide or mixed oxides thereof or zeolites. Most preferably, the catalysts comprise rhodium and optionally platinum on an active aluminum oxide. Conventional three-way catalysts can also be used.

The means for introducing the hydrocarbons into the first exhaust gas stream at (8) can be any spray nozzles known in the art such as ultrasonic nozzles, single component nozzles or two-component nozzles which use e.g. air to atomize the diesel fuel.

Valves (6) and (7) are optional and allow changing the mass flow relation between the first and second exhaust stream. Thereby it is possible to change the air/fuel ratio of the rejoined exhaust gas stream from lean to reach values as required to treat the subsequent exhaust gas cleaning unit (9).

Figure 2:
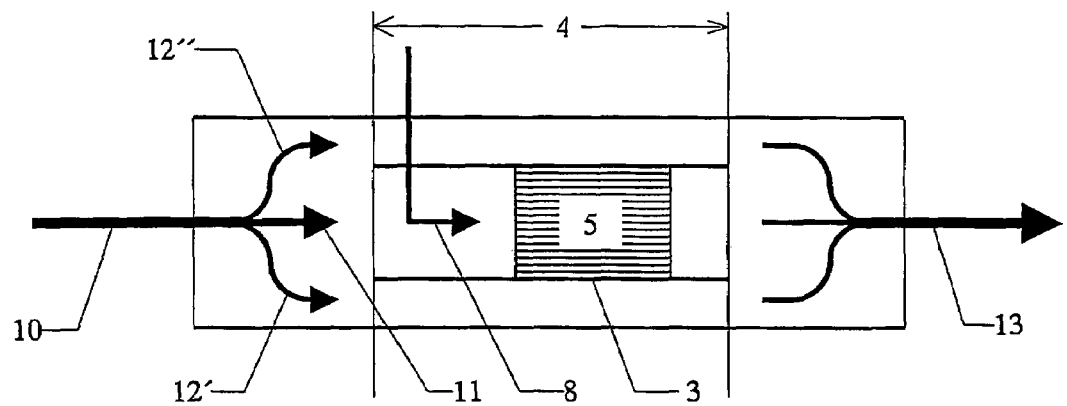
FIG. 2: Possible arrangement of first and second exhaust pipes to one another

FIG. 2 shows a preferred arrangement of the apparatus of the invention. The first exhaust gas pipe (3), which comprises the catalyst (5) for auto thermal reforming of the hydrocarbons introduced via nozzle (8), is arranged within the second exhaust gas pipe (4). In this apparatus, second exhaust gas pipe (4) forms only a section of the exhaust gas pipe (2) of the diesel engine. The exhaust gas stream (10) coming from the manifold of the diesel engine splits into the first exhaust gas stream (11) and second exhaust gas stream (12' and 12"). The first exhaust gas stream enters the first exhaust gas pipe (3). After leaving the first exhaust gas pipe the first exhaust gas stream is rejoined with the second exhaust gas stream to form the rejoined exhaust gas stream (13).

The temperature of the exhaust gas stream entering the first exhaust gas pipe depends on the operating point of the diesel engine and may vary between 100 and 500° C. In the embodiment of FIG. 2, the second exhaust gas stream flows along the jacket surface of the first exhaust gas pipe and helps to establish and maintain the starting temperature for auto thermal reforming, which depends on the light off temperature of catalyst (5) for catalytic partial oxidation. Therefore, introduction of hydrocarbons into the first exhaust gas stream for performing auto thermal steam reforming, is only started when the exhaust gas temperature of the diesel engine has exceeded said light off temperature.

The reformed exhaust gas stream leaving the first exhaust gas pipe has a temperature of approximately 600 to 800° C.

Figure 3:
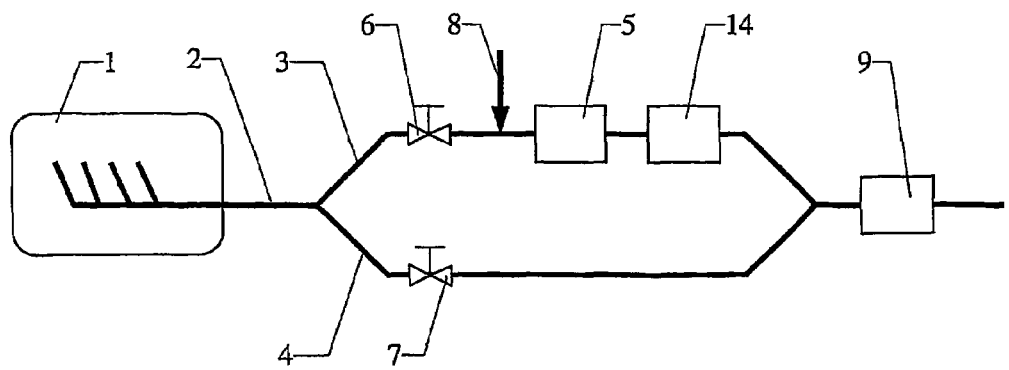
FIG. 3: Schematic representation of a certain embodiment of the apparatus according to the invention including a fuel cell

FIG. 3 shows another embodiment of the apparatus of the invention. In this embodiment a solid oxide fuel cell (14) has been arranged after reforming catalyst (5). The reformed exhaust gas stream leaving the reforming catalyst contains increased amounts of carbon monoxide and hydrogen and is directly used as fuel gas for the solid oxide fuel cell. The direct use of the reformed exhaust gas stream as fuel is possible since a solid oxide fuel cell has high operating temperatures and is not sensitive to carbon monoxide poisoning as a polymer electrolyte fuel (PEM) cell. But it is also contemplated to lie within the scope of this invention to cool and purify the reformed exhaust gas stream so that it can be used as fuel for a PEM fuel cell. As shown in FIG. 3, the off-gas of the fuel cell is rejoined with the second exhaust gas stream and finally cleaned in exhaust gas cleaning unit (9).

Having thus described and exemplified the invention with a certain degree of particularity, it should be appreciated that the claims that follow are not to be so limited but are to be afforded a scope commensurate with the wording of each element of the claims and equivalents thereof.

The invention claimed is:

1. An apparatus for auto thermal steam reforming of hydrocarbons, said apparatus comprises:
   a) a first exhaust gas pipe, wherein said first exhaust gas pipe is capable of carrying a first partial exhaust gas stream;
   b) a fuel injector and a reforming catalyst located in sequence within said first exhaust gas pipe; and
   c) a second exhaust gas pipe, wherein said second exhaust gas pipe is capable of carrying a second partial exhaust gas stream, wherein the first exhaust gas pipe is a pipe piece that has an outer surface area and an inner surface, said pipe piece being located completely within the second exhaust gas pipe such that the second partial exhaust gas stream is passed along the outer surface area of the first exhaust pipe.

2. The apparatus according to claim 1, wherein said apparatus further comprises a means for controlling partial flow of exhaust gas between said first exhaust gas pipe and said second exhaust gas pipe.

3. The apparatus according to claim 1, wherein downstream of the reforming catalyst, said first exhaust stream and said second exhaust gas stream form a joined exhaust gas stream and further comprising an exhaust gas cleaning unit for cleaning the joined exhaust gas stream before it is emitted into the atmosphere.

4. The apparatus according to claim 3, wherein said exhaust gas cleaning unit contains in sequence a diesel oxidation catalyst and a particulate filter.

5. The apparatus according to claim 3, wherein said exhaust gas cleaning unit contains a nitrogen oxide storage catalyst.

6. The apparatus according to claim 1, further comprising a solid oxide fuel cell located within said first exhaust gas pipe and downstream of said reforming catalyst.

7. An automotive engine comprising a diesel engine and the apparatus of claim 1.

8. A process for generating an exhaust gas enriched in hydrogen and carbon monoxide, said process comprising:
   a) splitting an exhaust gas stream into a lean first exhaust gas stream and a second exhaust gas stream;
   b) introducing fuel into the lean exhaust gas stream to reduce its normalized air/fuel ratio to a value of below 1 and conducting this exhaust gas stream over a reforming catalyst;
   b) burning a first portion of an injected fuel on the catalyst to heat the reforming catalyst to a reforming temperature; and
   c) converting a second portion of said injected fuel into a gas comprising carbon monoxide and hydrogen, wherein the heat of the second exhaust gas stream is used to heat the lean first exhaust gas stream and to facilitate establishment of reforming conditions.

9. The process according to claim 8, wherein the gas comprising carbon monoxide and hydrogen is joined with the second exhaust gas stream to form a joined exhaust gas stream enriched in carbon monoxide and hydrogen.

10. The process according to claim 9, wherein the joined exhaust gas stream is treated in an exhaust gas cleaning unit before it is emitted into the atmosphere.

11. The process for regenerating a NOx storage catalyst comprising the process of claim 9 and exposing said joined exhaust gas enriched in hydrogen to the NOx storage catalyst.

12. The process for regenerating a particulate filter comprising the process of claim 9 and exposing said joined exhaust gas enriched in hydrogen to the particulate filter.

13. A process for generating electricity in a fuel cell wherein the gas comprising carbon monoxide and hydrogen according to claim 8 is exposed as fuel to a fuel cell.

14. A method of using an apparatus for auto thermal steam reforming, said method comprises operating a motor vehicle, wherein said motor vehicle comprises the apparatus of claim 1.

* * * * *